United States Patent [19]

Crosson

[11] Patent Number: 4,574,543
[45] Date of Patent: Mar. 11, 1986

[54] TRUCK BAY DOOR APPARATUS

[76] Inventor: Robert J. Crosson, 2209 Long Lake Rd., New Brighton, Minn. 55112

[21] Appl. No.: 522,399

[22] Filed: Aug. 11, 1983

[51] Int. Cl.4 .............................................. E06B 7/23
[52] U.S. Cl. ................................ 52/173 DS; 14/71.3
[58] Field of Search ........................... 52/173, 173 DS; 14/71.3, 71.5

[56] References Cited

U.S. PATENT DOCUMENTS

| | | | |
|---|---|---|---|
| 2,739,645 | 3/1956 | Urquhart | 160/185 |
| 2,869,635 | 1/1959 | Cubitt et al. | 160/118 |
| 3,331,425 | 7/1967 | Groves et al. | 160/126 |
| 3,528,086 | 9/1970 | Conger | 52/173 DS |
| 3,665,997 | 5/1972 | Smith et al. | 160/41 |
| 4,003,170 | 1/1977 | Mellyn | 52/173 DS |
| 4,020,607 | 5/1977 | Bjervig | 52/173 DS |
| 4,081,018 | 3/1978 | Szwartz | 160/113 |
| 4,213,279 | 7/1980 | Layne | 52/173 |
| 4,349,992 | 9/1982 | Layne | 52/173 DS |

Primary Examiner—James L. Ridgill, Jr.
Attorney, Agent, or Firm—Merchant, Gould, Smith, Edell, Welter & Schmidt

[57] ABSTRACT

A door apparatus (10) is disclosed. The door apparatus (10) includes means for connecting to a door frame (20) of a building (11) suitable for housing a truck body assembly, e.g., a semi-trailer (13). The semi-trailer (13) includes a body (15) supported by wheels. The door apparatus (10) obstructs the space between the truck body (15) and the door frame (20) of the building, thereby permitting the truck body (15) to extend through the doorway while maintaining a weather-resistant and secure enclosure. In a preferred embodiment the door apparatus (10) includes left and right sections, (18) and (14) respectively, that are vertically hingedly connected to the door frame (20); an upper section (12) that is horizontally hinged to the door frame (20); and a lower section (16) that is vertically hinged to sections (18) and (14). Resilient body surface flaps (34) connected to the inner edges of the door sections (14), (18), (12) and (16) provide weather resistance and adaptability to truck bodies of varying sizes.

13 Claims, 9 Drawing Figures

U.S. Patent  Mar. 11, 1986  Sheet 4 of 4  4,574,543
FIG. 8
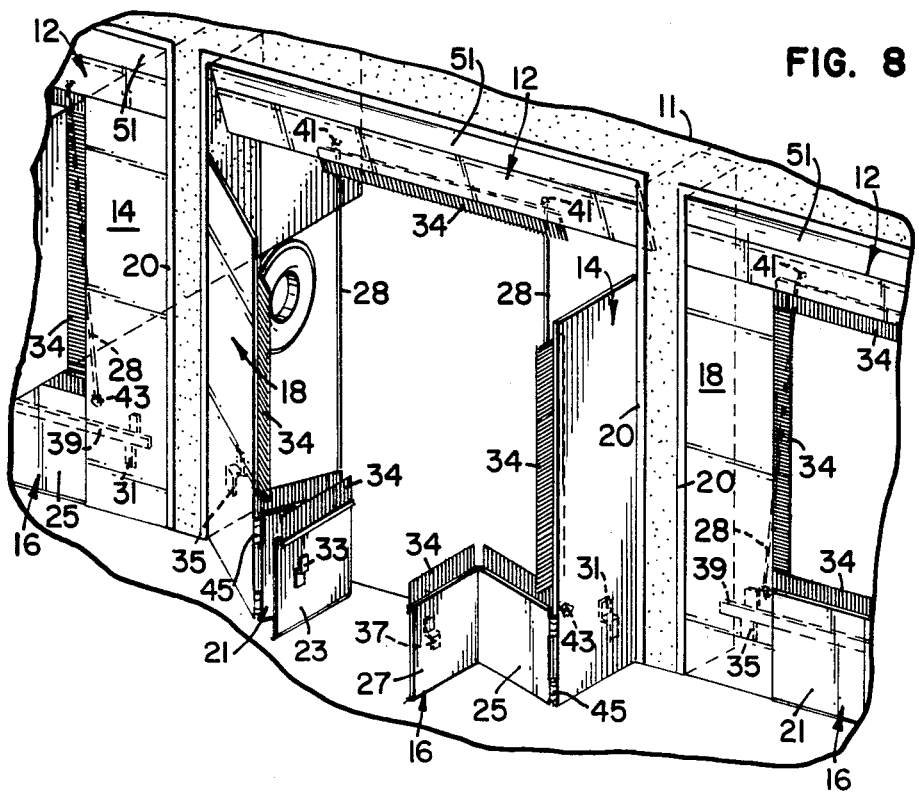
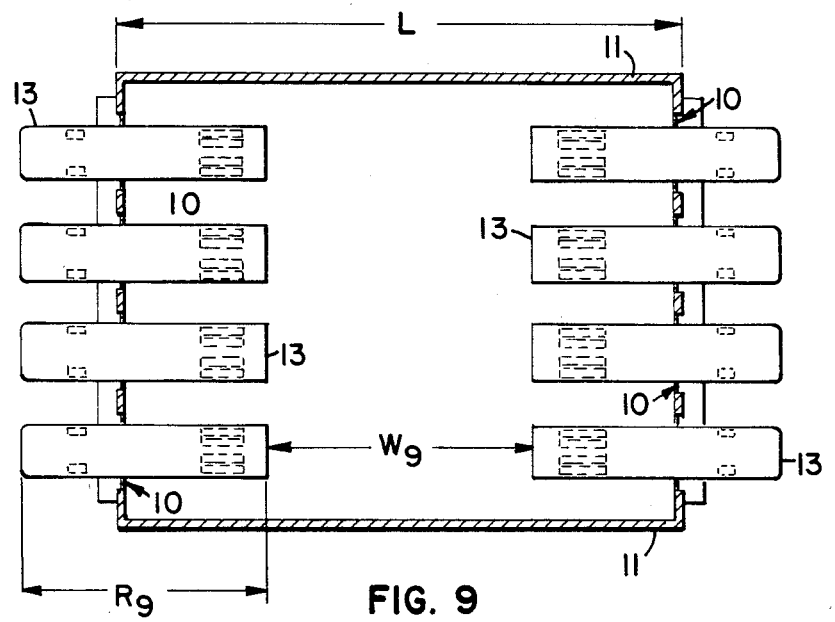
FIG. 9

TRUCK BAY DOOR APPARATUS

FIELD OF THE INVENTION

This invention relates to buildings suitable for housing trucks and, more particularly, to specially designed doors that allow the buildings (e.g. warehouses and repair garages) to house semi-trailers which are too large for the buildings to otherwise efficiently accomodate, and to allow for more practical use of space within buildings.

BACKGROUND OF THE INVENTION

The economical and rapid distribution of raw materials and finished goods is of the utmost importance. Trucks are components of many distribution systems, and a very common type of truck is the tractor-trailer combination or "semi" as it is often called. The trailer of a tractor-trailer combination will henceforth be referred to as a trailer or "semi-trailer," and a semi-trailer generally includes an open or closed towable body and at least one set of wheels for supporting the trailer body. Other types of trucks are also used in distribution systems, and each type of truck generally includes a body that is supported by at least one set of wheels. For the most part, the following description is directed to tractor-trailer combinations, though the invention may be used with many types of trucks. Thus, when the term trailer or semi-trailer is employed, it should be interpreted to include truck bodies generally.

As one component of a distribution system, a semi-trailer must be loaded and unloaded at various locations. One loading/unloading method involves the use of a "dock" which may be open but is sometimes sized to enclose only the rear end of a semi-trailer, and into which the entire semi-trailer cannot be driven. Docks often include "seals" which seal against the top, bottom and side surfaces of the semi-trailer body to limit air exchange between outside and inside the building. For example, U.S. Pat. No. 3,665,997, issued to V. O. Smith and A. T. Dietrich, shows a dockseal assembly having a flexible headseal for engaging the top surface of a trailer body. Similarly, U.S. Pat. No. 4,213,279, issued to R. C. Layne, discloses a dockseal that seals against the top, bottom and side surfaces of a trailer body.

Semi-trailers are also used in conjunction with warehouses in some distribution systems. Warehouse operations often involve driving the trailer through an opening in one of the outside walls of a building and into its interior. With the trailer so positioned within the warehouse, it may be said that the warehouse "houses" the trailer even though the trailer may not be completely contained within the outside walls of the building. Since warehouse loading and unloading is done through the rear doors of a semi-trailer, it is not necessary to bring the entire semi-trailer within the building. In other words, a portion of the trailer may in fact lie outside of the building, and sealing the space between the trailer body and the outside wall and floor of the building becomes a problem.

From time to time any semi-trailer will require mechanical repairs or upgrades. Such maintenance is typically performed in a service building or garage that is designed to accommodate several trailers, often in two rows of bays, as shown in FIG. 1, a top plan view of such a building, with its roof removed and with several semi-trailers within the building. A semi-trailer can be backed into a bay so that its running gear (i.e., wheels, brakes, etc.) is more accessible. A trailer can also be pulled into a bay with its running gear adjacent to the service bay door to permit, for example, work on an air conditioning unit mounted on the front surface of the trailer. In either event, when two trailers are positioned in opposing bays such that the longitudinal axes of the semi-trailers are substantially colinear, a working space $W_x$ is created between the trailers. The subscript x corresponds to the Figure number. The longitudinal axis of a semi-trailer body is herein defined as an axis that passes lengthwise through a semi-trailer and is substantially perpendicular to the front and rear surfaces of the semi-trailer. Is is this working space $W_x$ that the workers must share, and the work might include welding on one trailer and the charging of an air conditioning system on another trailer. In fact, most of the repair and modification work is performed on the front or rear end of a semi-trailer, the particular end being serviced typically being located adjacent to the working space $W_x$. It is thus imperative that there be enough working space $W_x$ so that the workers do not interfere with one another to minimize the danger of accidents.

Many service buildings were designed and built to accommodate trailers having a length of 40 feet, the maximum length formerly allowable. The trailer length is designated with an $R_x$ in the accompanying figures. In these buildings, the working space $W_x$ between bays was made large enough to safely accommodate most maintenance tasks on 40 foot trailers. For example, a typical service building was 100 feet wide, thus permitting the working space $W_x$ to be as large as approximately 20 feet. FIG. 1, not to scale, represents this situation, with $W_1$ being approximately 20 feet, $R_1$ being approximately 40 feet, and L, the width of the service building, being approximately 100 feet.

Regulations have been relaxed, however, to permit longer trailers. Forty-eight foot trailers are presently acceptable and are becoming more commonplace, particularly due to the ability to "stretch" semi-trailers in length, an upgrade operation performed on a shorter semi-trailer. It is possible that even longer trailers will be allowed in the future, considering escalating energy costs. Longer trailers result in a smaller working space $W_x$ when a standard service building is used, as shown in FIG. 2, a top plan view of a 100 foot wide building containing a plurality of longer semi-trailers. For example, if a 100 foot building contained two axially-aligned longer trailers, each 48 feet long, less than 4 feet between trailers would remain, an undesirable situation.

Thus, there exist at least two problems with the use of semi-trailers in typical distribution systems. First, when a semi-trailer is used in the context of a warehouse situation where the semi-trailer is backed through an opening in an outside wall of building but is not entirely contained within the building, there are the problems of sealing out the elements and maintaining security so that the goods within the warehouse and semi-trailer may be protected. And secondly, particularly in light of longer semi-trailers, existing service buildings are often too short to permit safe and efficient simultaneous servicing of two longer semi-trailers in opposing service bays.

With respect to the second problem cited above, i.e., inadequate service buildings, several "solutions" have been proposed. One proposal, obviously uneconomical in most cases, is to erect new service buildings. The new buildings could be made long enough to accommodate two 48-foot trailers, but again it is possible that even longer trailers will be allowable in the future.

Another proposed solution to the service building problem discussed above is to extend pre-existing service buildings. Again, such a "solution" involves large capital expenditure and is simply unworkable in many cases. Still another disadvantageous approach is to retain existing buildings but not simultaneously accomodate longer semi-trailers in opposing bays. As longer, perhaps "stretched," semi-trailers are becoming more and more prevalent, such a limitation would have a deleterious effect on a service organization's business.

Another proposal is to simply allow the ends of the semi-trailers to extend through the door openings, thus effectively precluding a complete enclosure of the semi-trailers and the interior of the service building. Such a practice would result in a situation analogous to the warehouse operations discussed above where a portion of the semi-trailer protrudes through an opening in the outside wall of the building, and in both cases there are the problems of security risks, energy loss and discomfort to the workers within the building during periods of inclement weather.

Each of the proposed solutions mentioned above possesses shortcomings. The first three solutions, i.e., a new building, an extension to the old building and the limitation on use of opposing bays, are all potentially quite costly. The fourth solution, allowing the semi-trailers to extend through openings in the outside wall, presents security, energy loss, and comfort problems.

The present invention is directed to the short-comings possessed by the proposed solutions discussed above. Particularly, the invention allows the occupant of a building, whether it be a warehouse or a service building, to utilize the building without having to erect another building and without having to extend the building. Thus, capital funds are conserved and construction delays are avoided. The present invention also allows the operator to use all of the bays within his building regardless of the lengths of the semi-trailers. Importantly, particularly in the service building situation, the present invention completely encloses the interior of the building yet permits a large working space $W_x$ to create a better working environment for the service personnel.

SUMMARY OF THE INVENTION

The present invention comprises a door apparatus that is capable of being attached to a wall of a building that is suitable for fully or partially housing a truck body assembly. A semi-trailer is a type of truck body assembly, and it is used herein as an example of a truck body assembly that may be accomodated by a door apparatus of the present invention. It should again be noted that the term "house," unless indicated otherwise, means to at least partially contain the semi-trailer; the entire semi-trailer need not fall within the confines of the outside walls of the building in order for the building to "house" the semi-trailer.

The door apparatus of the present invention forms a "seal" around the semi-trailer when the semi-trailer is positioned within the opening in the wall of the building, substantially obstructing the space between the wall and the surfaces of the semi-trailer body that project outwardly of the building to maintain security and to minimize undesirable weather effects. In a preferred embodiment, with a semi-trailer positioned within an opening in a wall of a building, the door apparatus substantially obstructs horizontal sub-openings above and below the semi-trailer body and vertical sub-openings to the left and right of the semi-trailer body between the semi-trailer body and the wall of the building. Preferably, the door apparatus of the present invention seals the aforesaid sub-openings through the use of a resilient seal for sealing engagement with the surfaces of the body to better seal out the elements from the interior of the building.

In one embodiment, a left vertical door section is vertically hinged to the outside wall; a right vertical door section is likewise vertically hinged to the outside wall; an upper door section is horizontally hinged to the outside wall; and a lower door section includes a plurality of subdoors that are vertically hinged to the left and right door sections. The door sections are hingedly attached to the wall so that they can be pivoted to admit the semi-trailer assembly. In one embodiment, once the semi-trailer assembly is in position within the opening, a pair of ropes attached to the upper door section can be tightened to urge the upper door section into coplanar alignment with the left and right door sections.

BRIEF DESCRIPTION OF THE DRAWINGS

FIG. 8 is a perspective view from outside the building of the door apparatus shown in FIG. 3, a semi-trailer not in place and the door apparatus being in a partially folded state.

FIG. 9 is a top plan view of a service building incorporating the door apparatus shown in FIG. 3, with the roof of the building removed.

DETAILED DESCRIPTION OF THE DRAWINGS

Figure 3:
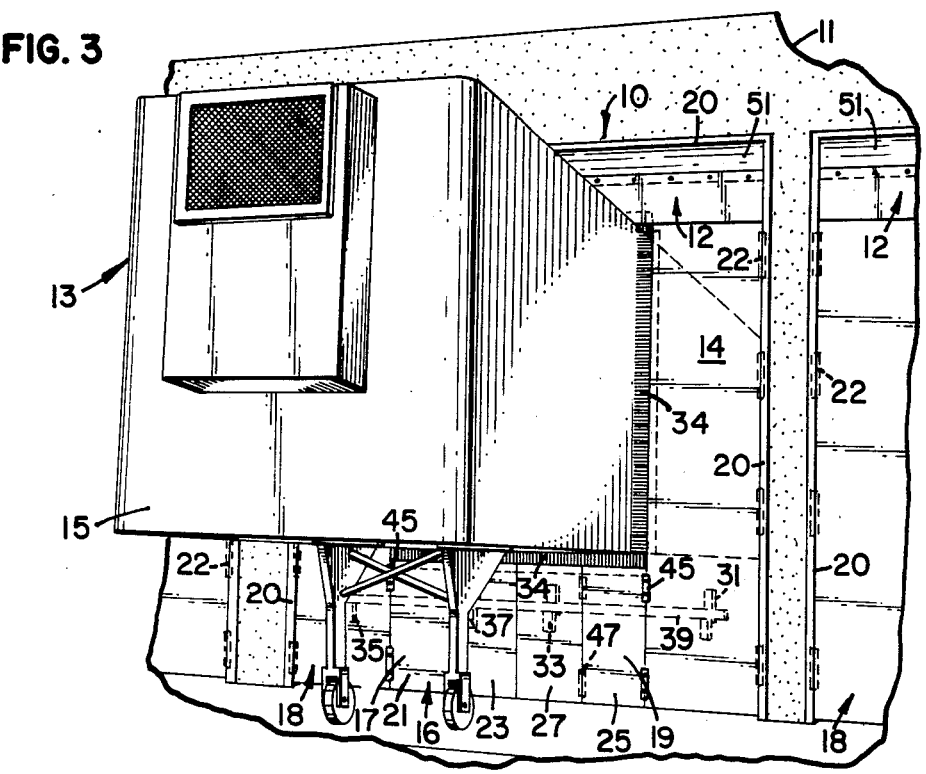
FIG. 3 is a front and side perspective view of a building including the door apparatus of the present invention, the door apparatus being in the closed position with a semi-trailer in place.

Referring to the figures in which like numerals represent like components and assemblies throughout the several views, FIG. 3 shows a perspective view of a building incorporating the door apparatus of the present invention, the building being indicated generally with the reference numeral 11 and the door apparatus being indicated generally with the reference numeral 10, with a semi-trailer 13 in place. The semi-trailer 13 includes a semi-trailer body 15 supported by wheels. The semi-trailer 13 is shown with its front end on the outside of the building 11. The rear end of the semi-trailer 13, not shown in FIG. 3, is enclosed within the building 11 by the door apparatus 10 that obstructs the space between the semi-trailer body 15 and door frame 20. Thus, if the building 11 were a service building, service personnel could, for example, work on the brakes of the semi-trailer 13 within the building 11 and be completely isolated from inclement weather without. Further, at the end of the day, the building 11 could be locked and the door apparatus 10 would maintain the security of the interior of the building 11 and the interior of the semi-trailer 13 as well. It should be noted that, as shown in FIG. 9, when the door apparatus 10 of the present invention is utilized, a much larger working space $W_x$ is achievable. It should also be noted that the semi-trailer 13 could be oriented so that its front end is within the building and its rear end is without so that, for example, the air conditioning unit could be serviced. In the case of a warehouse, the semi-trailer 13 could be loaded and/or unloaded over a period of time with weather resistance and security provided by the door apparatus 10.

Figure 5:
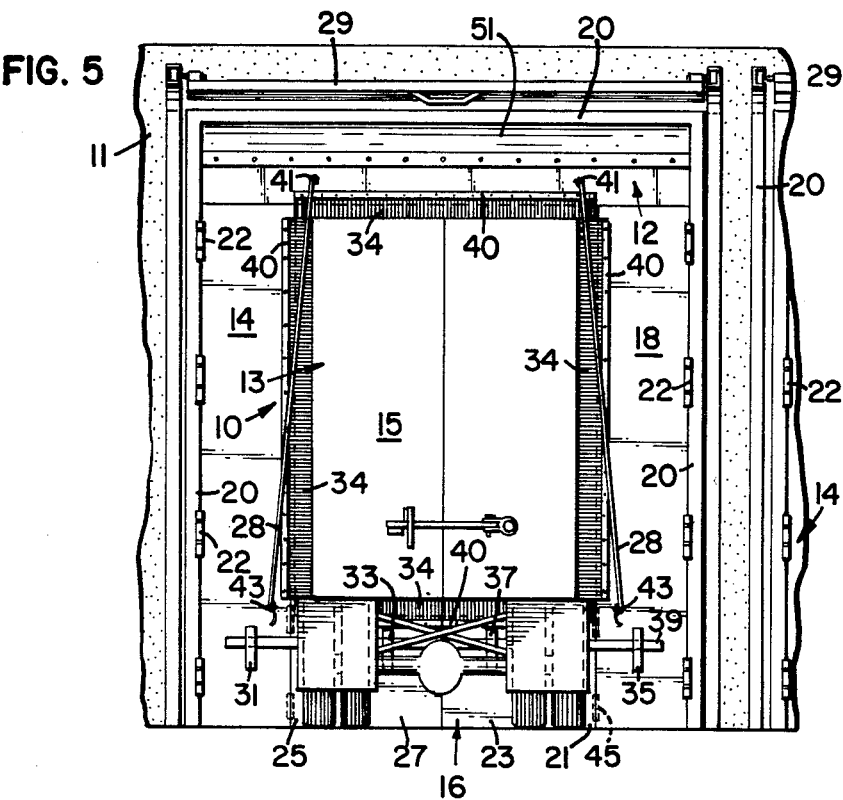
FIG. 5 is a rear elevational view of the door apparatus shown in FIG. 3 with a semi-trailer in place.

The door apparatus 10 includes an upper section 12, a lower section 16, a right section 14 and a left section 18. Each section may be said to "seal," or substantially obstruct, a sub-opening; e.g., the upper section 12 seals an upper horizontal sub-opening, and the left section 18 seals a left vertical sub-opening. Clearly, the sub-openings need not be precisely "horizontal" or "vertical," yet it is convenient to so label the sub-openings for the sake of explanation. As will be further discussed below, the upper, left and right sections 12, 18 and 14 respectively, are preferably hinged to the outside of a door frame 20 so that a standard overhead rolling door may still be carried by the inside of the door frame of the building 11 as shown in FIG. 5. The lower section 16 is, in that embodiment, hinged to the left and right sections, 18 and 14 respectively.

Figure 4:
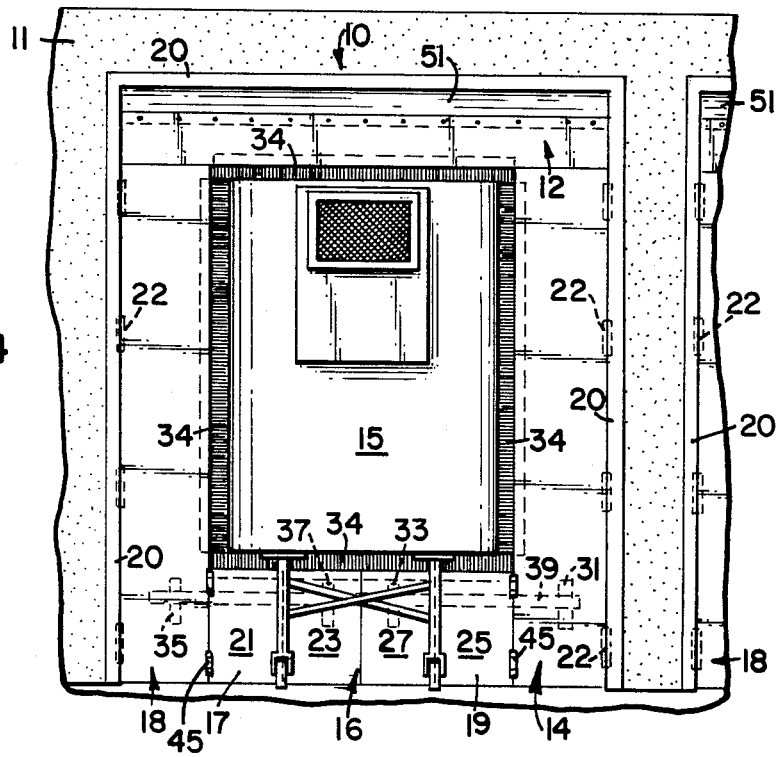
FIG. 4 is a front elevational view of the door apparatus shown in FIG. 3 with a semi-trailer in place.

FIG. 4 shows a front elevational view of a preferred embodiment of the invention. The left and right sections, 18 and 14, respectively, are connected to the outside of the door frame 20 preferably through the use of a plurality of hinges 22. In this embodiment, the hinges 22 are the type used to hingedly attach the door of a semi-trailer to a semi-trailer body. Other types of hinges or the like could also be used, and the type of hinge or the like will vary with the type of wall or door frame construction. The upper section 12 is hingedly connected to the upper portion of the door frame 20 by a flexible sheet 51. Sheet 51 is preferably made of rubber but could alternatively be made of any flexible or pliable material. At its upper edge, the flexible sheet 51 is pinched between an upper sheet strip 53 and the upper portion of door frame 20; at its lower edge the flexible sheet 51 is pinched between a lower sheet strip 55 and upper door section 12. The sheet strips 53 and 55 are preferably metal and form holes that admit rivets, screws or the like.

The left and right sections 18 and 14 are vertically hinged to the door frame 20 while the upper section 12 is horizontally hinged to the door frame 20. Though it is preferred that the components of the door apparatus 10 be connected to the door frame 20, in a more general sense it is sufficient that the components be connected to the wall that forms the opening through which the semi-trailer is driven.

When the door sections 14, 18, 12 and 16 are in their "closed" positions, as shown in FIGS. 3 and 4, they preferably are substantially coplanar and not overlapping. That is, the edges of the door sections 14, 18, 12 and 16 are butted or nearly butted together and the inside and outside surfaces of the door sections 14, 18, 12 and 16 are flush or coplanar.

Still with reference to FIG. 4, the lower section 16 is preferably hingedly attached to the left and right sections 18 and 14, respectively. The lower section 16 includes a left subsection 17 and a right subsection 19, said subsections 17 and 19 being hingedly connected to said left and right sections, 18 and 14, respectively. Each subsection is in turn hingedly divided into two sub-doors: left subsection 17 is divided into a left outermost sub-door 21 and a left innermost sub-door 23; right subsection 19 is divided into right outermost sub-door 25 and a right innermost sub-door 27. The outermost sub-doors 21 and 25 are connected by outer sub-doors hinges 45 to left and right sections 18 and 14, respectively. Inner sub-door hinges 47 interconnect the pairs of sub-doors 21, 23 and 25, 27. The sub-door hinges 47 and 45 are preferably the same type of hinge as hinge 22, though the sub-door hinges 45 and 47 can be of lighter gauge. The subsections 17 and 19 fill in the space or sub-opening between the bottom surface of body 15 and the ground plane, the subsections 17 and 19 being substantially flush or coplanar when they are in their extended or closed, as opposed to their folded, states. FIG. 8 shows the subsections 17 and 19 in partially folded states as further described below.

It will be understood by one ordinarily skilled in the art of door design that the door apparatus 10 of the present invention could be constructed of wood or man-made materials. The door apparatus 10 shown in the appended figures is constructed of a styrene honeycomb core sandwiched with sheet aluminum, this composite being manufactured under the name of "Nor-Core" by Norfield Corporation of Danbury, Conn. An aluminum honeycomb sandwiched with sheet metal could be utilized as well. The door apparatus could also be fabricated using plywood or other structural, planar materials. It will also be understood that the door apparatus 10 can be insulated to minimize heat energy transfer therethrough. For example, the door apparatus 10 could include a thermally insulating material such as a plastic foam sandwiched between a pair of structural members.

The inner edges of the door sections 18, 14, 12 and 16 preferably each include a resilient body surface flap 34 that can be attached to the door sections by any technique, including riveting. In the embodiment shown in FIG. 4, the flaps 34 are made of rubber sheet material, with the flaps 34 conforming to the shape of the body 15 when the semi-trailer 13 is in position. A brush could be used in lieu of a rubber sheet, the bristles of the brush deforming in an analogous fashion to a rubber material, but possessing greater stiffness. Thus, brushes might be used in some applications, such as for the flaps adjacent to the bottom surface of the body 15, where such added stiffness is desirable. It should further be noted that the flaps 34 of the sub-doors 21, 23, 25 and 27 must be independently movable so that the subsections 17 and 19 can fold as shown in FIG. 8. The body surface flaps 34 thereby give the door apparatus 10 greater weather resistance and also allow the door apparatus 10 to accommodate trailers having a range of sizes.

It should particularly be emphasized that the left and right sections 18 and 14 need not necessarily be hingedly connected to the outside of the door frame 20. For example, the door sections 18 and 14 could be supported by a slide with the sections being laterally slid into position once the semi-trailer 13 is in place. Also, clearly the opposing door sections could be C-shaped or in the shape of inverted L-sections. Also, in the same vein, the left and right door sections 18 and 14 could be hinged at their upper edges or could roll in a fashion similar to a standard rolling overhead door.

FIG. 5 shows a rear elevational view of the door apparatus 10 with the left section 18 now on the right side of the figure. FIG. 5 shows rivet plates 40 holding the resilient flaps 34 in place. Rivet plates 40 are preferably metallic and include holes through which rivets or screws pass. Resilient flaps 34 are thus pinched between the plates 40 and the door sections 16, 12, 14 and 18.

FIG. 5 also shows a standard rolling overhead door 29 mounted to the inside of the door frame 20. The standard door 29 is thus available for use even though the door apparatus 10 is connected to the outside of the door frame 20; and the opening formed by the door frame 20 can be completely obstructed when a semi-trailer is not in position within the opening.

The door apparatus 10 preferably includes a plurality of brackets attached to the inside surfaces of selected door sections so that the door apparatus 10 can be locked into place with the door sections substantially coplanar, as shown in FIGS. 3 through 7. Right and left outer brackets 31 and 35, respectively, are attached to right and left door sections 14 and 18, respectively. Right and left inner brackets 33 and 37, respectively, are attached to right and left innermost sub-doors 27 and 23, respectively. The brackets 31, 33, 35 and 37 are preferably made of aluminum and are attached to the door sections 14 and 18 and sub-doors 27 and 23 using rivets or the like. The brackets 31, 33, 35 and 37 are offset-shaped to accomodate a lock member 39, preferably a steel bar. Once in place, the lock member 39 prevents the subdoors 21, 23, 25 and 27 from folding, as shown in FIG. 8, and it also prevents the right and left door sections 14 and 18, respectively, from pivoting outwardly, as also shown in FIG. 8. The door apparatus 10 is thus securely locked, preventing intrusion into the building 11.

FIG. 5 also illustrates a pair of ropes 28. The robes 28 are attached to a pair of eyescrews 41, the left eyescrew 41 shown in detail in FIG. 6. The eyescrews are preferably 102 inches apart, the width of a standard semi-trailer. The ropes 28 hang substantially vertically, with their free ends being readily accessible to personnel, prior to positioning the semi-trailer 13 in the opening as illustrated in FIG. 8. The ropes 28 are preferably brightly colored to assist the truck drivers as they position the truck body assembles. Yellow nylong rope, often associated with boating apparatus, is preferable. When the semi-trailer 13 is in position, with the door apparatus 10 in an open state as shown in FIG. 8, the ropes 28 can be pulled vertically downward to urge the upper door section 12 into substantially coplanar alignment with side sections 14 and 18 once the side sections 14 and 18 are themselves closed. T-cleats 43, one each located on each of the side sections 18 and 14, are connected to the inside surfaces of side sections 14 and 18 and present tie-offs for the ropes 28. The sub-doors 21, 23, 25 and 27 must be separately aligned and locked into place using the lock member 39.

Figure 7:
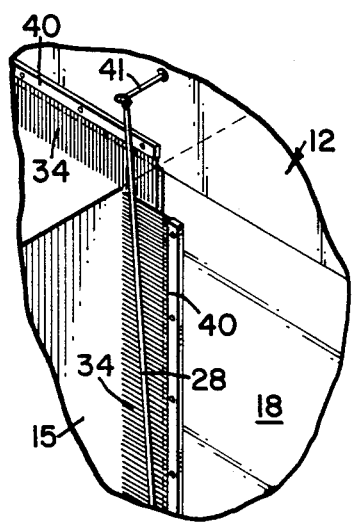
FIG. 7 is a view from inside the building showing the left door section and the upper door section of the door apparatus shown in FIG. 3.
Figure 6:
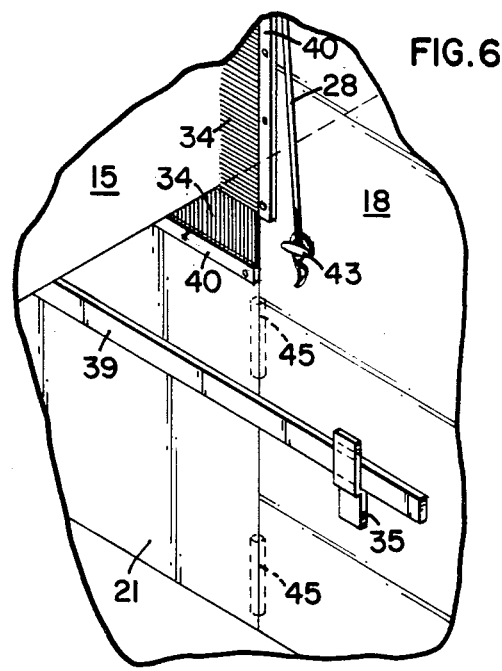
FIG. 6 is a view from inside the building showing the left door section and the lower door section of the door apparatus shown in FIG. 3.

FIGS. 6 and 7 show details of door apparatus 10, the details having been formerly described.

Figure 1:
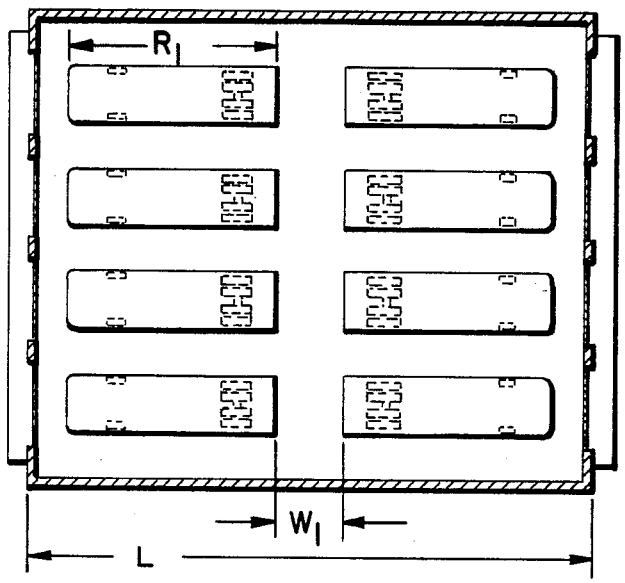
FIG. 1 is a top plan view of a standard semi-trailer service building with its roof removed, the building housing standard semi-trailers.
Figure 2:
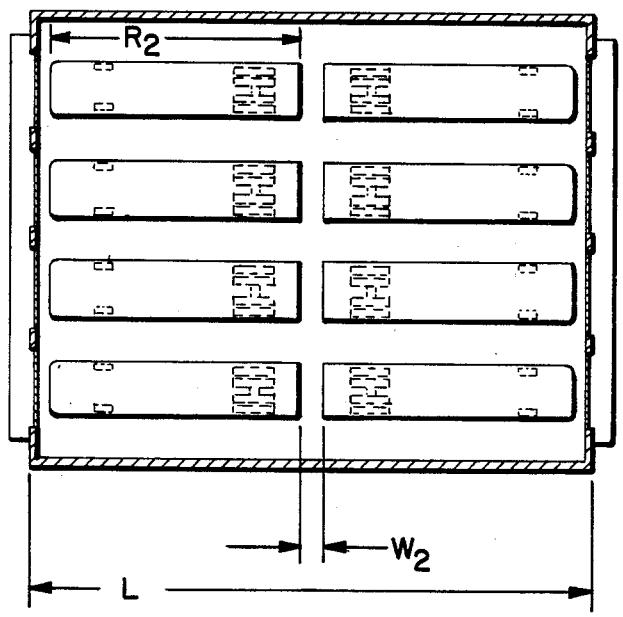
FIG. 2 is a top plan view of a standard semi-trailer building with its roof removed, the building housing "stretched" semi-trailers.

FIG. 9 shows several longer, perhaps "stretched", semi-trailers 13 in a standard service building supplied with doors 10 fabricated according to the present invention. That is, $R_9$ is substantially equal to $R_2$, shown in FIG. 2; and L is the same building width in both Figures. Semi-trailers 13 protrude through openings in the outside wall of the building in varying degrees allowing great flexibility in the working space $W_x$ within the building and enabling the working space $W_9$ to be as large as is necessary. A comparison of FIGS. 2 and 9 therefore clearly emphasize the advantages of the door apparatus 10.

Other modifications of the invention will be apparent to those skilled in the art in light of the foregoing description. This description is intended to provide a specific example of an individual embodiment which clearly discloses the present invention. Accordingly, the invention is not limited to this embodiment or to the use of elements having specific configurations and shapes as presented herein. All alternative modifications and variations of the present invention which follow in the spirit and broad scope of the appended claims are included.

I claim:

1. A door apparatus in operative connection to a wall of a building suitably housing a truck body assembly, wherein the truck body assembly includes a body and wheels rotatably supporting the body; the height of the truck body assembly is greater than the height of the body and width of the truck body assembly is at least as great as the width of the body; and the wall of the building forms an opening such that when the truck body assembly is positioned in the opening a horizontal sub-opening is formed by virtue of the difference between the height of the opening and the height of the body and a vertical sub-opening is formed by virtue of the difference between the width of the opening and the width of the body, and wherein said door apparatus comprises:
    (a) horizontal sealing means substantially obstructing the horizontal sub-opening;
    (b) vertical sealing means substantially obstructing the vertical sub-opening;
    (c) first means operatively connecting said horizontal sealing means to the wall of the building; and
    (d) second means operatively connecting said vertical sealing means to the wall of the building, wherein said first connecting means permits movement of said horizontal sealing means to admit the wheels of the truck body assembly.

2. The door assembly in accordance with claim 1, wherein said horizontal sealing means comprises an upper door section for substantially obstructing the horizontal sub-opening proximate to the top surface of the body and a lower door section for substantially obstructing the horizontal sub-opening proximate to the bottom surface of the body; and said vertical sealing means comprises a left door section for substantially obstructing the vertical sub-opening proximate to the left surface of the body and a right door section for substantially obstructing the vertical sub-opening proximate to the right surface of the body.

3. The door apparatus in accordance with claim 2, wherein said first connecting means comprises upper horizontal means for horizontally hingedly connecting said upper door section to the wall of the building.

4. The door apparatus in accordance with claim 3, wherein said second connecting means comprises left vertical means for vertically hingedly connecting said left door section to the wall and right vertical means for vertically hingedly connecting said right door section to the wall.

5. The door apparatus in accordance with claim 4, wherein said lower door section comprises a lower left door subsection and a lower right door subsection; and said first connecting means further comprises lower left means for vertically hingedly connecting said lower left door subsection to said left door section and lower right means for vertically hingedly connecting said lower right door subsection to said right door section.

6. The door apparatus in accordance with claim 5, wherein each of said lower door subsections is comprised of a pair of sub-doors, an outermost sub-door and an innermost sub-door, vertically hinged together.

7. The door apparatus in accordance with claim 6, wherein each of said door sections and subsections comprises resilient means on its inner edge for sealingly engaging the surfaces of the body.

8. The door apparatus in accordance with claim 7, wherein each of said resilient means comprises a rubber-like flap.

9. The door apparatus in accordance with claim 8, further comprising a left rope and a right rope, wherein said ropes are fixedly attached to said upper door section, whereby axial tension in said ropes urges said door sections into a substantially coplanar alignment.

10. The door apparatus in accordance with claim 9, further comprising means for holding said left and right door sections and said sub-doors in substantially coplanar alignment, whereby said door apparatus cannot be opened from outside of the building.

11. The door apparatus in accordance with claim 10, wherein said holding means comprises a left outer bracket operatively connected to said left door section; a right outer bracket operatively connected to said right door section; a left inner bracket operatively connected to said innermost left sub-door; a right inner bracket operatively connected to said innermost right sub-door; and a lock member, wherein said lock member removably engages said brackets and said brackets are operatively connected to the inside surfaces of said associated door sections and sub-doors.

12. A door apparatus in operative connection to a wall of a building suitably housing a truck body assembly, wherein the wall of the building forms an opening suitable for admitting the truck body assembly, and the truck body assembly includes a body and wheels rotatably supporting the body, and wherein said door apparatus comprises:

(a) an upper door section proximate to the top surface of the body when the truck body assembly is positioned within the opening, said upper door section being horizontally hingedly connected to the wall of the building, and said upper door section substantially obstructing the sub-opening between the top surface of the body and the wall;

(b) a left door section proximate to the left surface of the body when the truck body assembly is positioned within the opening, said left door section being vertically hingedly connected to the wall of the building, and said left door section substantially obstructing the sub-opening between the left surface of the body and the wall;

(c) a right door section proximate to the right surface of the body when the truck body assembly is positioned within the opening, said right door section being vertically hingedly connected to the wall of the building, and said right door section substantially obstructing the sub-opening between the right surface of the body and the wall;

(d) a lower door section proximate to the bottom surface of the body when the truck body assembly is positioned with the opening and substantially obstructing the sub-opening below the bottom surface of the body, said lower door section including left and right subsections, said left subsection being vertically hingedly connected to said left door section and said right door subsection being vertically hingedly connected to said right door section, and each of said subsections including a pair of sub-doors, an outermost sub-door and an innermost sub-door, each pair of sub-doors being vertically hingedly connected together, wherein said lower door section is movable to admit the wheels of the truck body assembly;

(e) a left rope and a right rope, said ropes being operatively connected to said upper door section;

(f) a left outer bracket operatively connected to said left door section, right outer bracket operatively connected to said right door section, left inner bracket operatively connected to said innermost left sub-door, right inner bracket operatively connected to said innermost right sub-door, and a lock member, wherein said brackets are operatively connected to the inside surfaces of said door sections and sub-doors, and said lock member being removably engageable with said brackets, thereby securely holding said left and right sections and lower door sections in coplanar alignment; and (g) resilient means operatively connected to said inner edges of said door sections for sealingly engaging the body, wherein said door sections are movable to admit the truck body assembly, and once the truck body assembly is admitted and positioned within the opening, axial tension in said robes urges said upper door section into coplanar alignment with said left and right door sections.

13. A door apparatus for use in combination with a wall of a building comprising:

(a) an upper door section;
(b) hinge means for connecting the upper door section to the wall of the building;
(c) a side door section;
(d) hinge means for connecting the side door section to the wall of the building; and
(e) a bottom door section hingedly connected to the side door section, wherein the door sections form a rectangular opening having a width of approximately 102 inches, whereby the rectangular opening is suitable for conforming about a semi-trailer.

* * * * *